United States Patent
Zhong

(10) Patent No.: US 7,285,882 B2
(45) Date of Patent: Oct. 23, 2007

(54) INTEGRATED ELECTRIC MOTOR DRIVEN COMPRESSOR

(75) Inventor: Jianping Zhong, Chesterton, IN (US)

(73) Assignee: Sullair Corporation, Michigan City, IN (US)

( * ) Notice: Subject to any disclaimer, the term of this patent is extended or adjusted under 35 U.S.C. 154(b) by 0 days.

(21) Appl. No.: 11/127,550

(22) Filed: May 12, 2005

(65) Prior Publication Data

US 2006/0255667 A1    Nov. 16, 2006

(51) Int. Cl.
  *H02K 9/00* (2006.01)
(52) U.S. Cl. .......................... 310/58; 310/52
(58) Field of Classification Search ............ 310/52–59, 310/60 A, 61–63, 254, 261; 418/161–167
  See application file for complete search history.

(56) References Cited

U.S. PATENT DOCUMENTS

| | | | |
|---|---|---|---|
| 3,060,335 A | * | 10/1962 | Greenwald .................. 310/54 |
| 3,796,526 A | | 3/1974 | Cawley |
| 4,889,475 A | | 12/1989 | Gannaway |
| 5,174,740 A | * | 12/1992 | Jang ........................... 418/55.6 |
| 5,222,879 A | | 6/1993 | Kapadia |
| 5,246,349 A | | 9/1993 | Hartog |
| 5,605,045 A | * | 2/1997 | Halimi et al. ................. 60/607 |
| 6,045,344 A | | 4/2000 | Tsuboi |
| 6,422,844 B2 | | 7/2002 | Hioki |

OTHER PUBLICATIONS

International Search Report, dated Sep. 25, 2006.

* cited by examiner

*Primary Examiner*—Thanh Lam
(74) *Attorney, Agent, or Firm*—Carlson, Gaskey & Olds

(57) ABSTRACT

A motor driven compressor assembly includes a motor housing having a fluid inlet and a fluid outlet. A motor is disposed within the motor housing and includes a rotor that is coupled to a rotatable shaft and a stator. Several passages fluidly connect the fluid inlet and the fluid outlet. One passage is located radially outward of the stator and another passage extends through the rotatable shaft. A compressor is in fluid communication with the fluid outlet of the motor housing. Operation of the compressor produces a fluid stream through the motor housing. The fluid stream transfers heat away from the motor to cool the motor.

15 Claims, 2 Drawing Sheets

INTEGRATED ELECTRIC MOTOR DRIVEN COMPRESSOR

BACKGROUND OF THE INVENTION

This invention relates to vacuum pumps and, more particularly, to a motor driven compressor assembly including a motor that is fluidly connected to a compressor.

Typical motor driven compressor assemblies include a reluctance motor fluidly connected to an inlet port of a screw compressor such that the operation of the screw compressor evacuates an internal portion of the reluctance motor. The reluctance motor includes a rotor that rotates relative to a stator. The rotor is spaced apart from the stator such that air evacuated from the reluctance motor passes through the space between the rotor and the stator. The compressor thereby produces a low pressure within the internal portion of the reluctance motor. The rotor produces less noise with lower air pressure, however, the low pressure may produce a pressure drop at the inlet port of the compressor. As a result of the pressure drop, the compressor may operate inefficiently or produce an inconsistent vacuum.

Another problem with typical motor driven compressor assemblies is that the reluctance motor produces significant heat during operation. If the heat is not adequately removed, the reluctance motor may overheat which may result in a malfunction in the reluctance motor or the compressor.

Conventional motor driven compressors utilize air flow through the space between the rotor and the stator to communicate heat away from the reluctance motor. Disadvantageously, the space is too small to flow a significant quantity of air there through, which minimizes heat dissipation from the reluctance motor.

Accordingly, there is a need for a motor driven compressor assembly that more effectively cools the motor without a significant pressure drop at the inlet of the compressor.

SUMMARY OF THE INVENTION

The motor driven compressor assembly according to the present invention includes a motor housing having an inlet and an outlet. The outlet is fluidly connected to a compressor such that the operation of the compressor produces a fluid stream through the motor housing. The fluid stream through the motor housing communicates heat away from a motor within the motor housing to cool the motor.

Preferably, a shaft passage is located along a longitudinal axis of a motor shaft. A motor passage is located between a stator and a rotor of the motor. An outer passage is located radially outward from the stator, between the stator and the motor housing. The passages provide sufficient space for fluid to flow through such that fluid streaming through the motor housing is not significantly restricted by the passages.

Accordingly, the motor driven compressor assembly cools the motor without a significant pressure drop at the inlet of the compressor. This invention addresses further provides enhanced capabilities while avoiding the shortcomings and drawbacks of the prior art.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
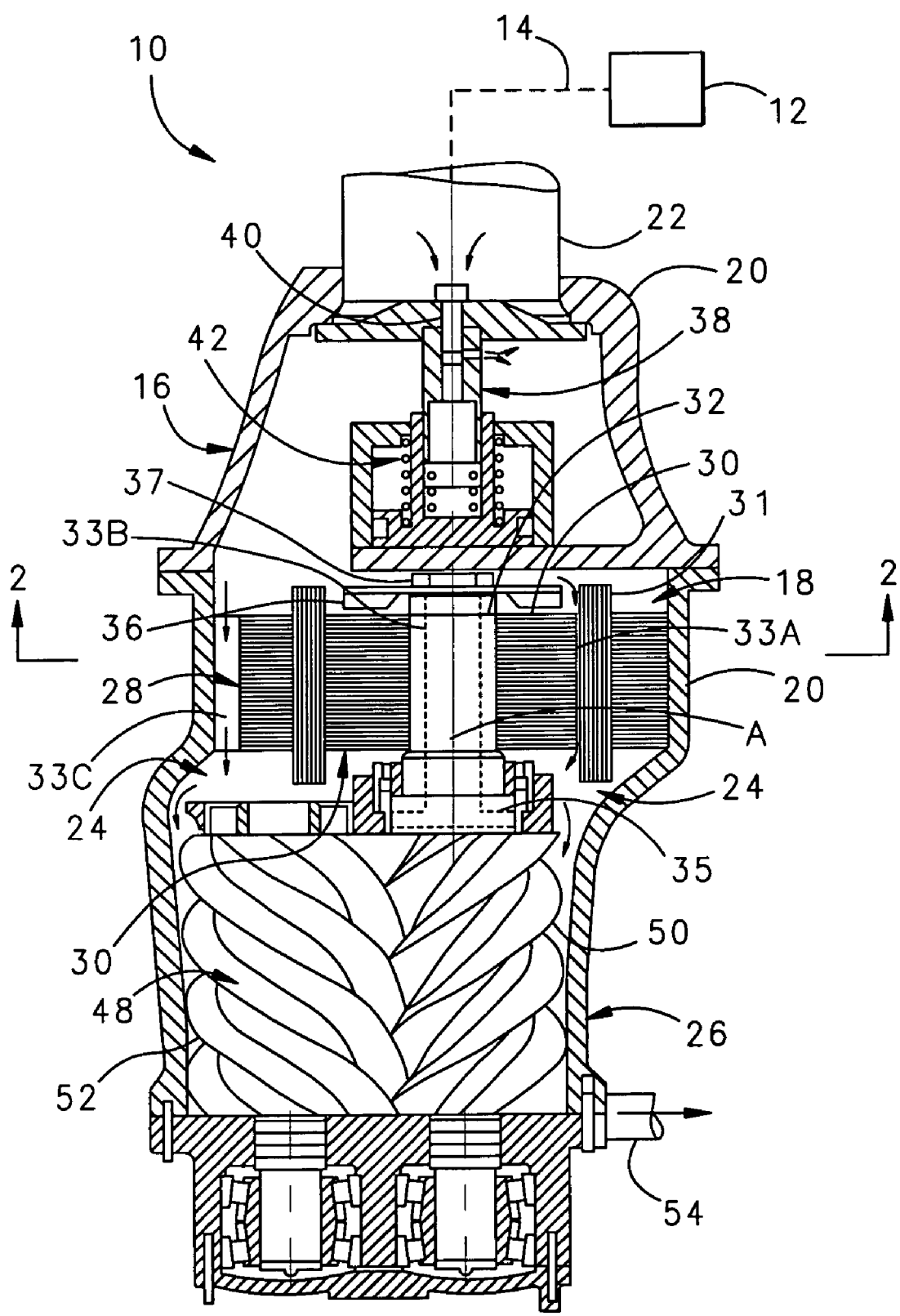
FIG. 1 is a schematic view of a vacuum system including a motor driven compressor.

FIG. 1 illustrates selected portions of an example vacuum system 10 including a vacuum region 12, such as an industrial area that requires a vacuum to move materials from one location to another. The vacuum region 12 is fluidly connected to a suction line 14, which is fluidly connected to a motor driven compressor 16. The motor driven compressor 16 evacuates the vacuum region 12 through the suction line 14.

The motor driven compressor 16 includes a motor 18, preferably a permanent magnet motor, within a motor housing 20. The motor housing 20 can be made from separate housing pieces as is illustrated, or from a single integrated housing. The motor housing 20 includes an inlet 22 fluidly connected to the suction line 14 and an outlet 24 fluidly connected to a compressor 26.

The motor 18 includes a stator 28 and a rotor 30 having permanent magnets 31. A motor passage 33A extends between the stator 28 and the rotor 30. The rotor 30 is connected to a shaft 32 that rotates about a longitudinal axis A. One section end of the shaft 32 is located in the motor housing 20 and another end of the shaft 32 is located in the compressor 26. The shaft 32 includes a shaft passage 33B that extends along the longitudinal axis A through the shaft 32. The shaft passage 33B includes an opening 35 that extends in a direction that is transverse to the longitudinal axis A at the outlet 24 of the motor housing 20. The shaft passage 33B and opening 35 fluidly connect the inlet 22 of the motor housing 20 to the outlet 24.

Figure 2:
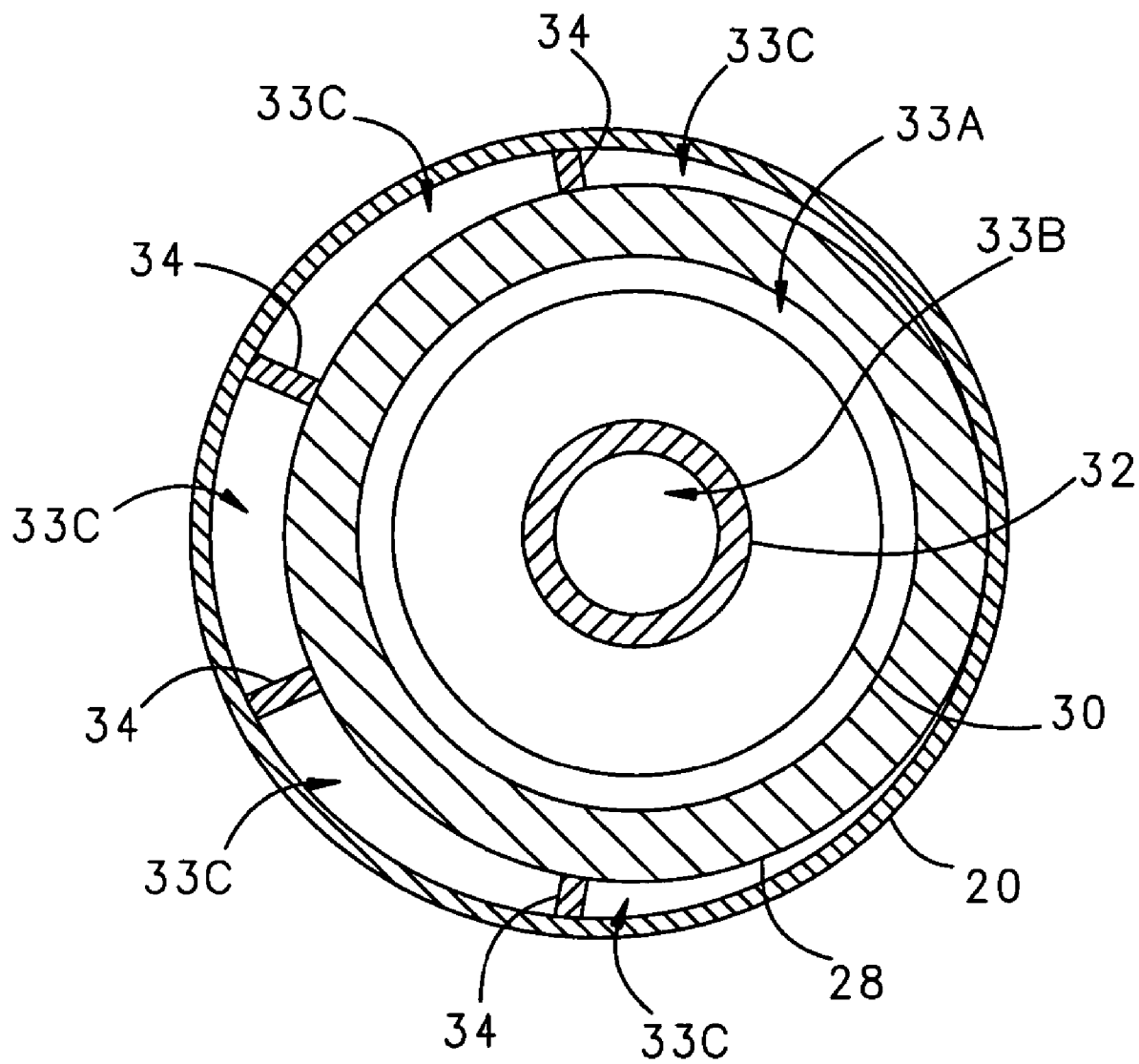
FIG. 2 is a schematic view of the motor driven compressor of FIG. 1.

Securing members 34 secure the motor 18 within the motor housing 20 (FIG. 2). An outer passage 33C is provided between the motor housing 20 and the stator 28. The outer passage 33C fluidly connects the inlet 22 to the outlet 24 of the motor housing 20.

A fan 36 is coupled to the end of the shaft 32 within the motor housing 20. A lock nut 37 or the like secures the fan 36 on the shaft 32 such that the fan 36 rotates with the shaft 32 to blow more fluid through the passages 33A, 33B, and 33C. The fan 36 includes a suction side on the inlet 22 side of the fan 36 and a discharge side on the outlet 24 side of the fan 36, as will be described below.

A valve assembly 38 is located between the motor 18 and the inlet 22 within the motor housing 20. The valve assembly 38 includes a valve member 40 in fluid communication with the inlet 22 and the suction line 14. An actuator 42 moves the valve member 40 between open and closed positions to control fluid flow through the valve assembly 38.

The outlet 24 of the motor housing 20 is fluidly connected to the compressor 26. The compressor 26 includes a male compressor screw 50 coupled to the shaft 32 for rotation with the shaft 32. A female compressor screw 52 is disposed in a meshing relationship with the male compressor screw 50 for rotation with the first compressor screw 50. Operation of the male compressor screw 50 and the female compressor screw 52 compresses fluid streaming into the compressor 26 from the outlet 24. A compressor outlet 54 is fluidly connected to the compressor 26 for discharge of compressed fluid.

During operation, the motor 18 is selectively activated to rotate the rotor 30. The rotor 30 rotates the shaft 32 to rotate the first and second compressor screws 50 and 52. Rotation of the compressor screws 50 and 52 compresses fluid within the compressor 26 and forces the compressed fluid out of the compressor outlet 54. Discharge of compressed fluid from the compressor outlet 54 produces a suction at the outlet 24 of the motor housing 20. The suctioning at the outlet 24 produces a fluid stream from the vacuum region 12 through the suction line 14, inlet 22, and motor housing 20.

When fluid enters the motor housing 20, the fluid streams from the inlet 22 to the outlet 24 by way of at least one of the passages 33A, 33B, and 33C (as depicted by arrows in FIG. 1). The stator 28, rotor 30, and shaft 32 transfer heat that is produced during operation of the motor 18 to the fluid streaming through the passages 33A, 33B, and 33C. The streaming fluid transfers the heat to the motor housing 20, which dissipates the heat to the surrounding environment. At least a portion of the streaming fluid, or carries the heat away from the stator 28, rotor 30, and shaft 32 through the compressor 26 to cool the motor 18.

The passages 33A, 33B, and 33C expose the streaming fluid to the stator 28, rotor 30, and shaft 32 and to cool the motor 18 to an acceptable operation temperature. Conventional motor driven compressor assemblies heretofore provided minimal exposure between a streaming fluid and the motor to significantly cool the motor. Preferably, the motor 18 is a permanent magnet motor, which generates less heat to dissipate and is generally smaller than some other types of motors such as inductance motors such that a permanent magnet motor is preferred. Given this description however, one of ordinary skill in the art will be able to adapt the disclosed examples for all types of motors and to meet the needs of their particular application.

The passages 33A, 33B, and 33C provide sufficient space for fluid to flow through such that fluid streaming through the motor housing 20 is not significantly restricted by the passages 33A, 33B, and 33C. That is, the passages are large enough to handle the stream of fluid without producing a pressure build-up on the inlet 22 side or a pressure drop on the outlet 24 side. This provides the benefit of a continuous and relatively uniform supply of fluid to the compressor 26 without a significant pressure drop at the outlet 24 of the motor housing 20. It should be understood that one of ordinary skill in the art with the benefit of the teachings herein will be able to properly size the passages to assure significant flow without a significant pressure drop The valve assembly 38 selectively controls the fluid streaming in through the inlet 22. This provides the benefit of controlling the magnitude of suction produced within the vacuum region 12 and also allows control over the amount of fluid streaming through the motor housing 20 to cool the motor 18.

The fan 36 further controls the magnitude of the suction. As is known, fans are generally designed to move fluids from a suction side to a discharge side of the fan. Rotation of the fan 36 produces additional suction at the inlet 22 side that draws more fluid through the inlet 22. The fan 36 also facilitates fluid flow from the motor housing 20 into the compressor 26. On the outlet 24 side of the fan 36, the fan 36 pushes fluid out of the motor housing 20 and into the compressor 26. This feature provides the benefit of increasing the rate of fluid streaming through the motor housing 20 to increase cooling of the motor 18. Additionally, the increase in the rate of fluid streaming through the motor housing 20 charges the compressor 26 with more fluid to increase the efficiency of the compressor 26.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A motor driven compressor assembly comprising:
a motor housing having a fluid inlet and a fluid outlet;
a motor disposed at least partially within said motor housing, said motor including a rotatable shaft having a shaft passage there through to fluidly connect said fluid inlet and said fluid outlet;
a compressor in fluid communication with said fluid outlet, said compressor providing suction to move fluid from said motor through said shaft passage into said compressor, wherein the compressor then discharges the fluid out of said fluid outlet; and
a fan upstream from said shaft passage relative to said fluid inlet and said fluid outlet, and said fan is coupled to said rotatable shaft for rotation therewith.

2. The assembly as recited in claim 1, wherein said shaft includes a first section and a second section, said first section being received in said motor housing and coupled to a rotor, and said second section being received in said compressor and coupled to a compressor screw.

3. The assembly as recited in claim 1, wherein said rotatable shaft includes a longitudinal axis and an opening fluidly connected to said passage, and said opening extends in a direction transverse to said longitudinal axis.

4. The assembly as recited in claim 1, further comprising a valve in fluid communication with said fluid inlet.

5. The assembly as recited in claim 1, wherein said motor includes a stator having a periphery, and a stator passage extends between said periphery and said motor housing, said stator passage fluidly connecting said fluid inlet and said fluid outlet.

6. The assembly as recited in claim 1, wherein said motor comprises a permanent magnet motor.

7. A motor driven compressor assembly comprising:
a motor housing having a fluid inlet and a fluid outlet;
a motor disposed at least partially within said motor housing, said motor including a rotor that is rotatable about an axis and a stator;
a passage that fluidly connects said fluid inlet and said fluid outlet, said passage being radially outward of said stator relative to said axis, and said passage having a radial dimension that varies along a circumference of said stator; and a compressor in fluid communication with said fluid outlet.

8. The assembly as recited in claim 7, wherein said stator includes a periphery and said passage extends along said periphery.

9. The assembly as recited in claim 7, wherein said passage is between said motor housing and said stator.

10. The assembly as recited in claim 7, further comprising a valve in fluid communication with said fluid inlet.

11. The assembly as recited in claim 7, further comprising a rotatable shaft coupled to said rotor, said rotatable shaft having a shaft passage there through that fluidly connects said fluid inlet and said fluid outlet.

12. The assembly as recited in claim 7, wherein said motor includes a rotatable shaft coupled to said rotor and rotatable with said rotor, and a fan coupled to said rotatable shaft, said fan being rotatable with said rotatable shaft.

13. The assembly as recited in claim 1, wherein said fluid inlet is nearer to said motor than to said compressor, and said fluid outlet is nearer to said compressor than to said motor.

14. The assembly as recited in claim 1, wherein said motor housing includes a cylindrical portion, and said motor is eccentrically located within said cylindrical portion.

15. The assembly as recited in claim 7, wherein said passage includes a radially inner surface comprising said stator and a radially outer surface comprising said motor housing.

\* \* \* \* \*